Patented Feb. 1, 1944

2,340,757

UNITED STATES PATENT OFFICE 2,340,757

ISOCYANATES AND RELATED SUBSTANCES AND PROCESS FOR THEIR MANUFACTURE

Walther Kaase, Reichenbach in Vogtland, and Ernst Waltmann, Krefeld, Germany, assignors to Heberlein Patent Corporation, New York, N. Y., a corporation of New York No Drawing. Application March 18, 1938, Serial No. 196,622. In Germany May 2, 1935

12 Claims. (Cl. 260—453)

This invention relates to isocyanates and similar substances, and to processes for their manufacture.

This application is a continuation in part of our copending application Serial No. 76,738, filed April 28, 1936.

We have found in accordance with our invention a series of new and useful products which may be designated under the general formula R.X.Y.N=C=O, in which R is an alkyl radical of at least 10 carbon atoms, X is a hetero group such as oxygen, sulfur, or nitrogen, or groups containing them such as CO.O, O.CO, NR', NR'.CO, CO.NR', SO$_2$, NR'.SO$_2$, SO$_2$NR', in which R' is hydrogen or a hydrocarbon radical, and Y is a hydrocarbon radical containing not more than six carbon atoms. These compounds thus include straight chain alkyl compounds containing the groups mentioned and also include aliphatic-aromatic compounds. We have also found in accordance with our invention certain levulinic and cyanuric isocyanates. These above products are particularly useful, for instance, in producing water-repellence in textile materials. We have also found in accordance with our invention new and useful processes for making such isocyanates. Compounds described but not claimed herein are claimed in our copending application Serial No. 512,994, Nov. 29, 1943.

The principal object of the present invention accordingly is to provide a series of useful compounds of the type mentioned and to produce simple efficient processes for the manufacture of such compounds.

The invention comprises the novel products as well as the novel processes and steps of processes according to which such products are manufactured, the specific embodiments of which are described hereinafter by way of example and in accordance with which we now prefer to practice the invention.

In accordance with our invention we have found that amines containing at least ten carbon atoms (including amine-hydrochlorides or similar salts), under suitable conditions, may be converted by substances such as phosgene into the corresponding isocyanate. Similarly carboxylic acids and esters may be converted into corresponding isocyanates. The ten carbon atoms may be contained in alkyl radicals separated from the N=C=O group by a hetero group or may be contained in the aliphatic portion of an aliphatic-aromatic radical.

As coming under the above process may be mentioned the treatment of amines with phosgene in which the amino group NH$_2$ is separated from the ten carbon atoms by a hetero group or groups with or without an aromatic radical. There may also be mentioned for example the treatment of hetero carboxylic acids with thionyl or like chloride to produce the carboxylic acid chloride. The latter is converted into the azide and then the azide is converted into the isocyanate by the release of nitrogen. There also may be mentioned the treatment of similar hetero esters R.COCH$_3$ whereby the ester is converted by N$_2$H$_4$.H$_2$O into a hydrazide. This is then converted into azide and the azide by release of nitrogen is converted into the isocyanate. In connection with these various reactions it is to be noted in accordance with the examples below that the substances designated by the radical R may be produced by a series of reactions to combine various elements with the ten or more carbon atoms included in this group.

Substances which we have successfully prepared by our processes in accordance with our invention included the following:

1-stearyl-oxy-phenylene-4-isocyanate

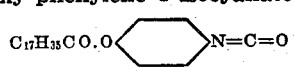

4-carboctadecoxy tetrahydrophenyl isocyanate

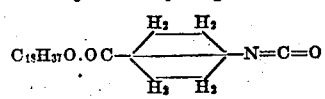

Cholesterol adipic acid ester isocyanate $C_{27}H_{45}O.CO(CH_2)_4N=C=O$

Octadecyl oxy acetic acid isocyanate $C_{18}H_{37}.O.CH_2.N=C=O$

Dodecyl mercaptan acetic acid isocyanate $C_{12}H_{25}.S.CH_2.N=C=O$

Stearyl glycolic isocyanate $C_{17}H_{35}.CO.O.CH_2.N=C=O$

Stearyl amino acetic acid isocyanate $$C_{17}H_{35}.CO.NH.CH_2.N=C=O$$

Stearyl methyl amino acetic acid isocyanate $$C_{17}H_{35}.CO.N.CH_3.CH_2.N=C=O$$

Urethane N-acetic acid isocyanate $$C_{18}H_{37}.O.O.C.NH.CH_2.N=C=O$$

Dodecyl ester of carbonyl glycine isocyanate $$C_{12}H_{25}.CO_2.CH_2.N=C=O$$

4-stearyl amino-1-phenyl isocyanate

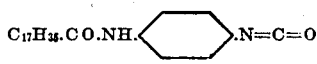

Hexadecyl oxy-phenyl isocyanate

Octadecyl mercapto-propriono isocyanate $$C_{18}H_{37}S.CH_2.CH_2.N=C=O$$

Octadecyl mercapto-acetic acid isocyanate $$C_{18}H_{37}S.CH_2.N=C=O$$

Levulinic dioctadecyl mercaptol isocyanate $$CH_3.C(S.C_{18}H_{37})_2.CH_2.CH_2.N=C=O$$

Cyanuric compound having the formula

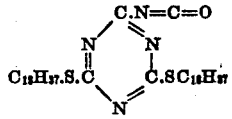

and others.

In manufacturing isocyanates, by the process which produces azides, we have found that such azides are also useful substances. For example they may be used directly for making textiles water-repellent.

Similarly in the formation of substances where carbamic acid chlorides are formed as intermediate products, such chlorides are also useful substances. They may also be used for producing water-repellence in textiles. For example the substance carbonyl glycine dodecyl chloride, $C_{12}H_{15}.CO_2.CH_2.NH.COCl$ we have successfully employed for this purpose.

The following are specific examples for making substances and carrying out processes which embody the invention as we now prefer to practice it. These examples are for illustrative purposes and the invention is not to be considered as limited thereto except as indicated in the appended claims:

Examples (1) 480 grams of octadecyl amine $C_{18}H_{37}.NH_2$ are dissolved in 1200 cc. dry xylol at 60° C. approximately. Thereupon gaseous dry hydrogen chloride (hydrochloric acid) is passed through the solution at 60° C. approximately to convert said amine to octadecyl amino hydro-chloride. Thereupon at a temperature of 140° C. approximately 1800 grams phosgene are passed through. Finally carbon dioxide (carbonic acid) at 140° C. approximately is introduced into the solution for the removal of the hydrochloric acid and phosgene residue. After such removal and after the solvent xylol has been drawn off by vacuum at 100° C. approximately, substantially pure octadecyl isocyanate remains.

The following is the reaction here involved:

$$C_{18}H_{37}NH_2.HCl + COCl_2 \rightarrow C_{18}H_{37}NH.COCl + HCl$$

$$C_{18}H_{37}NH.COCl \xrightarrow{heat} C_{18}H_{37}N=C=O + HCl$$

Instead of octadecyl amine mentioned above we may employ 18-amino-pentatriacontane which yields 18-pentatriacontane isocyanate.

Heptacosyl amine, heneicosyl amine and n-heptadecyl amine may be similarly treated to produce the isocyanate.

It is not necessary to use pure saturated amines as mixtures of saturated amines of high molecular weight are well suited for instance the mixture of amines which is obtained by hydrating in the well-known manner train oil (whale oil). These amines may be employed instead of the octadecyl amine mentioned above. Similarly 4-stearyl - amino - 1 - amino - benzol may be converted into the corresponding isocyanate by treatment with phosgene as above.

(2) As an example of the reaction using an alcohol we employ an alcohol of the sterol series for example cholesterol $C_{27}H_{45}.OH$. The reaction employing this material is as follows:

$$C_{27}H_{45}OH + ClCO(CH_2)_4COCl \rightarrow$$

adipic acid chloride $$C_{27}H_{45}O.CO(CH_2)_4COCl + HCl$$

cholesteral adipic acid chloride $$C_{27}H_{45}O.CO(CH_2)_4COCl + NaN_3 \rightarrow$$

$$C_{27}H_{45}O.CO(CH_2)_4CON_3 + NaCl$$

$$C_{27}H_{45}O.CO(CH_2)_4CON_3 \rightarrow$$

azide $$C_{27}H_{45}O.CO(CH_2)_4N=C=O + N_2$$

cholesterol adipic acid ester isocyanate

In carrying out this reaction 386 grams of cholesterol are mixed with 182 grams of adipic acid chloride and 80 grams of pyridine dissolved in 1500 grams of benzene at 40° C. Cholesterol-adipic acid chloride is formed and pyridine-hydrochloride salt is removed by filtration.

The adipic acid chloride is treated with sodium azide activated as indiacted below in the paragraph following the examples. For this purpose the solution of the adipic acid chloride is treated for 60 minutes with 65 grams of the activated azide at 40° C. The resultant cholesterol adipic acid azide solution is then refluxed for 1 hour to produce cholesterol adipic acid isocyanate.

(3) For the manufacture of an aliphatic isocyanate of the formula $C_{18}H_{37}O.CH_2.N=C=O$, we may employ the following procedure:

1/10 mol potassium and 1/10 mol octadecyl alcohol, $C_{18}H_{37}OH$, are heated in 100 cc. toluol at the boiling point for a few days until the potassium is dissolved. The potassium octadecyl alcoholate solution is heated at the boiling point for two hours with 1/10 mol of ethyl chloracetate, $$ClCH_2COOC_2H_5$$

thereupon a solution of 10 grams of potassium hydroxide in 250 c. c. of methanol is added and again boiled for four hours to saponify the ester. To the reaction mixture 500 c. c. of dilute hydrochloric acid are added. The toluol layer containing the acid is separated and washed with water. After concentration to one-half the volume, the same quantity of ligroin is added to the mixture which is placed in ice, whereupon the entire mass, after having been set aside for some time, solidifies into a crystalline paste. By washing with ice cold ligroin one obtains the crude acid in a practically colorless condition. After recrystallizing from acetone, it forms beautiful crystals of a melting point of 62° C.

The octadecyl-oxy-acetic acid thus obtained is caused to react with excess pure redistilled thionyl chloride at moderate temperature on the water bath, and the excess thionyl chloride is distilled off in a vacuum at the lowest possible temperature. The acid chloride of octadecyl-oxy-acetic acid thus obtained is stirred with excess sodium azide, which has been activated in accordance with the below method. There is first of all produced the azide of octadecyl-oxy-acetic acid, which, upon heating in a reflux for 2 hours, is converted into the corresponding isocyanate $C_{18}H_{37}.O.CH_2.N=C=O$, with the simultaneous release of nitrogen.

(4) For manufacturing an isocyanate of the formula $C_{12}H_{25}.S.CH_2.N=C=O$ using a mercaptan as starting material.

$\tfrac{1}{10}$ mol dodecyl mercaptan, $C_{12}H_{25}SH$, is dissolved in sodium alcoholate ($\tfrac{1}{10}$ mol sodium in 250 c. c. methanol) and this solution is heated with $\tfrac{1}{10}$ mol sodium chloracetate, $ClCH_2COONa$, for 10 hours at the boiling point. To the reaction mixture 500 c. c. dilute hydrochloric acid are added. The precipitated acid is filtered off and after drying is crystallized out of ligroin having a high boiling point. It forms colorless, lustrous scales of a melting point of 64° C.

The dodecyl mercapto acetic acid thus obtained is brought into reaction with excess pure thionyl chloride at moderate temperature on the water bath and the excess thionyl chloride is distilled off in a vacuum at the lowest possible temperature. The acid chloride of dodecyl mercapto acetic acid is stirred with excess sodium azide, activated as below. There is produced first of all the azide of dodecyl mercapto acetic acid, which, upon refluxing is converted into the corresponding isocyanate, $C_{12}H_{25}.S.CH_2N=C=O$, with the simultaneous release of nitrogen.

(5). For manufacturing an isocyanate of the formula $C_{17}H_{35}.CO.O.CH_2.N=C=O$ using an acid chloride with at least ten carbon atoms.

$\tfrac{1}{10}$ mol glycolic acid, $OH.CH_2.COOH$, is dissolved in 100 c. c. of pyridine; there is carefully added to this solution, while cooling it with ice water and shaking vigorously, a solution of $\tfrac{1}{10}$ mol stearyl chloride, $C_{17}H_{35}COCl$, in very little ether. The yellow colored reaction mixture, after having been set aside for six hours, is carefully heated until the precipitate formed is dissolved and the solution is poured into a large excess of dilute hydrochloric acid. The precipitated stearyl glycolic acid, is filtered, washed with water and after drying, and recrystallizing from acetone, appears in the form of beautiful crystals of a melting point of 89° C. The stearyl glycolic acid thus obtained is reacted with excess pure thionyl chloride at moderate temperature on the water bath and the excess thionyl chloride is distilled off in a vacuum at the lowest possible temperature. The acid chloride of stearyl glycolic acid is stirred with excess sodium azide activated as below. There is produced first of all the azide of stearyl glycolic acid which, upon heating, is converted into the corresponding isocyanate, $C_{17}H_{35}CO.O.CH_2.N=C=O$ with the simultaneous release of nitrogen.

(6). For manufacturing an isocyanate of the formula $C_{17}H_{35}.CO.NH.CH_2.N=C=O$ by a similar reaction.

To a solution of $\tfrac{1}{10}$ mol glycine, $NH_2.CH_2.COOH$, in sodium hydroxide solution ($\tfrac{1}{10}$ mol NaOH in 50 cc. water) there was added at 0° C. gradually, while stirring vigorously, alternately solutions of $\tfrac{1}{10}$ mol stearyl chloride in a little ether, and 50 cc. of 2N-sodium hydroxide solution and shaken for some time after adding.

After acidulation with hydrochloric acid, the stearyl amino acetic acid was filtered off, dried and recrystallized several times from acetone and also from methanol. The methyl ester was produced from the acid. The acid for this purpose was heated with a large excess of methanol with the addition of a small quantity of concentrated sulfuric acid for a number of hours, at the boiling point. After cooling, the ester crystallized out and could be purified by recrystallizing from acetone. Melting point 78–80° C.

The ester obtained is now, in accordance with the Curtius method (Journal für prakt. Chemie 264, page 430) converted into hydrazine by boiling with 14 grams hydrazine hydrate, $N_2H_4.H_2O$.

By the action of nitrous vapors on the hydrazide hydrochloride, the corresponding azide is produced in accordance with Curtius. From the latter there is produced the isocyanate, $C_{17}H_{35}CO.NH.CH_2.N=C=O$, by the release of nitrogen.

$C_{17}H_{35}.COCl + NH_2.CH_2COOH \rightarrow$
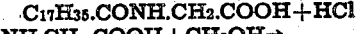
$C_{17}H_{35}.CONH.CH_2.COOH + HCl$
$C_{17}H_{35}.CONH.CH_2.COOH + CH_3OH \rightarrow$
$C_{17}H_{35}.CONH.CH_2.COOCH_3 + N_2H_4 \rightarrow$
$C_{17}H_{35}.CONH.CH_2.CONH.NH_2 + CH_3OH$ (add HCl to the amine)
$C_{17}H_{35}.CONH.CH_2.CONH.NH_2HCl + NO_2 \rightarrow$
$C_{17}H_{35}.CONH.CH_2.CON_3 + 2H_2O$
$C_{17}H_{35}.CONH.CH_2.CON_3 \rightarrow$
$C_{17}H_{35}.CONH.CH_2.N=C=O + N_2$ (7). For manufacturing an isocyanate of the formula $$C_{17}H_{35}.CO.N.CH_2.N=C=O$$
$$\qquad\qquad |$$
$$\qquad\qquad CH_3$$

similarly.

To the solution of $\tfrac{1}{10}$ mol sarcosine, $$CH_3.NH.CH_2.COOH$$

in 100 cc. pyridine there was added, drop by drop, while cooling with ice water and shaking, a solution of $\tfrac{1}{10}$ mol stearyl chloride in very little ether, and it was set aside for several hours. The brown colored reaction solution was carefully heated until the solution is produced of the precipitate which occurs and the solution is then poured into excess hydrochloric acid. The crude acid was purified by recrystallizing out of acetone. For the production of the ester, the acid was boiled in excess methanol, with the addition of sulfuric acid, for several hours; the ester which crystallized out after cooling was recrystallized from acetone and methanol.

The ester obtained is now converted, by boiling with hydrazine hydrate, into the hydrazide. By the action of nitrous vapors on the hydrazide hydrochloride there is produced the corresponding azide. From the latter there is produced, as heretofore set forth, the isocyanate, $$C_{17}H_{35}.CON.CH_3.CH_2.N=C=O$$

through the release of nitrogen.

(8) For manufacturing an isocyanate of the formula $C_{18}H_{37}.O.O.C.NH.CH_2.N=C=O$ from an alcohol.

$\tfrac{1}{10}$ mol octadecyl alcohol $C_{18}H_{37}OH$ was suspended in ether and an excess of phosgene was introduced at about 0° C. After setting aside for several hours in ice, the ether, together with the excess phosgene, and HCl liberated was evaporated in a vacuum and the residue was again dissolved in a small quantity of ether.

This solution of the stearyl ester of chlorformic acid was gradually added, while stirring well, at 0°, to the solution of 1/10 mol of glycine in 50 cc. 2N-sodium hydroxide solution, alternating with a like quantity of sodium hydroxide solution. After shaking for some time, it was acidulated with hydrochloric acid and the precipitated acid was recrystallized after filtering and drying from high boiling ligroin. Colorless scales of a melting point of 105° C., of urethane N-acetic acid $C_{18}H_{37}OOC.NH.CH_2.COOH$ were obtained.

The urethane-N-acetic acid

$$C_{18}H_{37}OOC.NH.CH_2.COOH$$

thus obtained is reacted with an excess of pure thionylchloride at moderate temperature on the water bath and the excess thionyl chloride is distilled off in a vacuum at the lowest possible temperature. The acid chloride of urethane-N-acetic acid is stirred with excess sodium azide activated as below; there is produced first of all the azide of urethane-N-acetic acid which, upon heating, is converted into the corresponding isocyanate, $C_{18}H_{37}O.O.C.NH.CH_2.N=C=O$, with the release of nitrogen.

(9) For manufacturing an isocyanate of the formula $C_{12}H_{25}.CO_2.CH_2.N=C=O$.

For the production of the glycine dodecyl ester, glycine was heated in excess lauric alcohol, $C_{12}H_{25}OH$, after saturation with hydrogen chloride, for several hours; the alcoholic layer was separated and the hydrochloric acid ester $C_{12}H_{25}COO.CH_2.NH_2.HCl$ was precipitated with ether. The glycine dodecyl ester hydrochloride forms colorless, glossy scales of a melting point of 68°. For conversion into the dodecyl ester of carbonyl glycine isocyanate, it was suspended in toluol and a great excess of phosgene was introduced at boiling temperature, until everything was dissolved. Thereupon the excess toluol and HCl was distilled off in a vacuum, leaving the isocyanate $C_{12}H_{25}COO.CH_2.N=C=O$.

(10) For the production of hexadecyl-oxyphenyl-isocyanate $C_{16}H_{33}.O.phenyl.N=C=O$ from a nitro compound; 660 grams of p-nitrophenol are dissolved in 3000 cc. ethyl alcohol and converted with 108 grams sodium (Na) into the sodium salt. Thereupon 1300 grams hexadecyl chloride $C_{16}H_{33}.Cl$, 70 grams of copper powder and 70 grams activated carbon (pulverized) are added and the mixture is heated in an autoclave for 3 hours to 180–185° C.

350 parts of the nitro-compound thus obtained are dissolved in 3000 parts ethyl alcohol each by weight. Thereupon 400 parts 38% hydrochloric acid are added and at 60–70° C. iron powder is added in small portions until the liquid is decolorized and until, upon a further addition of iron powder, no new precipitate is produced. Thereupon the liquid is made alkaline with concentrated aqueous solution of sodium carbonate ($Na_2CO_3$).

Suck off the iron compound while still warm; extract the latter with hot alcohol and pour the alcoholic filtrates into many times their volume of water, whereupon hexadecoxyphenyl amine precipitates. Suck off the precipitate, wash and dry. Now dissolve the hexadecoxyphenylamine $C_{16}H_{33}.O.phenyl-NH_2$ in 4–5 times its quantity of boiling toluene and introduce at first hydrogen chloride gas until hydrochlorides form and then send phosgene gas into the solution boiling on the reflux condenser, until the evolution of hydrochloric acid stops. Thereupon dispel the remaining hydrogen chloride gas and phosgene by bubbling dry carbon dioxide through the mixture to produce the isocyanate desired.

(11) Isocyanates derived from fatty acids containing a sulphur atom in their alkyl radical are useful products. They have an exceptionally good water-repelling effect when combined with textile materials. The long alkyl chain containing the carbon atoms interrupted by the sulphur atoms produces particularly good results when combined with textile materials. One method for producing such compounds is described above in Example 4. Another method for production is by the conversion of higher mercaptans with chloro-acetic acid or chloro-proprionic acid. The preparation is as follows:

1/10 mol octadecyl mercaptan is dissolved in sodium alcoholate—1/10 mol sodium in 250 cubic centimeters methanol—and this solution is heated with 1/10 mol sodium chloroacetate for 10 hours to the boiling point. To the reaction mixture 500 cc. of dilute hydrochloric acid are added; the precipitated acid is filtered off and after the drying it is recrystallized from high boiling ligroin. It forms colorless, glossy scales of a melting point of 84°.

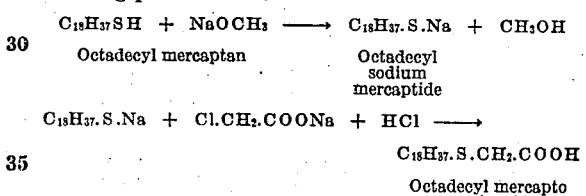

The octadecyl mercapto acetic acid is converted by means of thionyl chloride as above described or phosphorous pentachloride or phosphorous trichloride into chloride and the latter, by means of activated sodium azide as below described, into isocyanate in accordance with the equation:

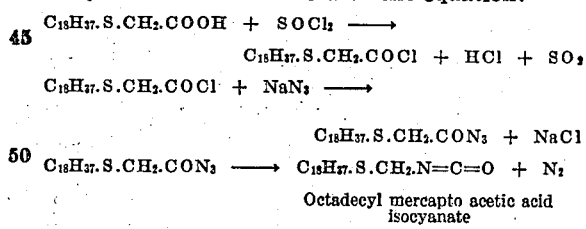

In place of sodium chloroacetate also sodium chloropropionate can be used. Then in an analogous manner octadecyl mercapto propionic acid isocyanate is produced. The industrially pure sodium azide used for the reaction is activated for conversion of the acid chlorides as indicated below.

(12) Suitable acid isocyanates are also obtained from 1 mol levulinic acid with 2 mols of mercaptan. When using octadecyl mercaptan the equation is as follows:

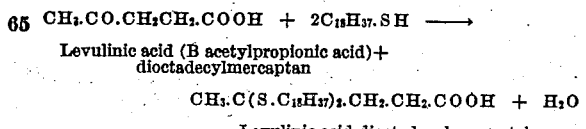

The levulinic acid-dioctadecyl mercaptol is converted into chloride by $SOCl_2$ and the latter is converted by means of activated sodium azide into isocyanate,

(13) Cyanuric trichloride and sodium octadecyl mercaptide may be reacted to produce a monochloro compound and this chloro group may be replaced by an amine group which is subsequently converted by phosgene to the N=C=O, isocyanate group in accordance with the following equation:

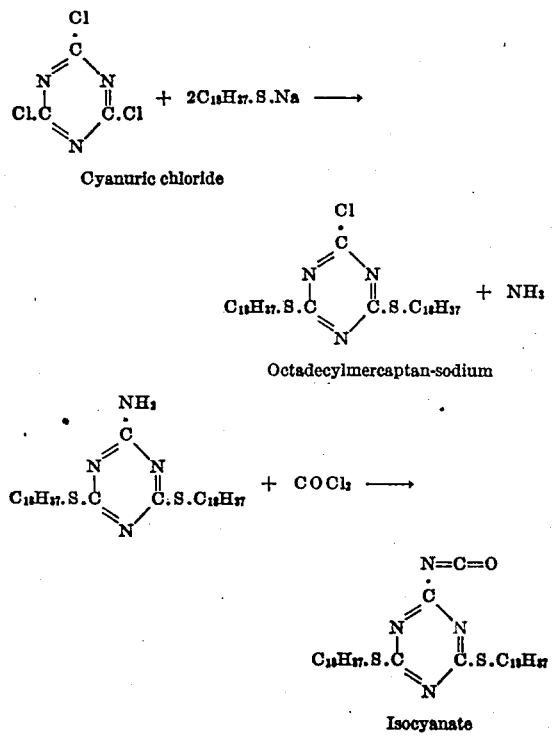

In carrying out this reaction the following process is employed:

1/10 mol octadecyl mercaptan is dissolved in sodium alcoholate—1/10 mol sodium in 250 cubic centimeters methanol—and this solution is heated with 1/10 mol cyanuric chloride for 10 hours to the boiling point.

The precipitated sodium salt is filtered off. Then a saturated solution of alcoholic ammonia (NH₃) is added to the monochloro-cyanuric compound and the mixture is heated in an autoclave 2 hours at 115° C. The resulting amino compound is treated with phosgene as described in Example 1, whereby the corresponding isocyanate is formed.

Sodium azide for use in the above reactions is preferably activated as follows: The sodium azide is first pulverized in a ball mill. A dough is made of 200 grams of the powdered azide with 65–70 cc. of water in which 3 grams of solid sodium hydroxide are dissolved. The paste is allowed to stand for about 30 minutes. The paste is then stirred together with about 200 cc. of dehydrated acetone until the floating acetone is again absolutely clear. Then it is sucked off and washed again with acetone. The azide thus prepared is thus employed for the above conversion, being stirred with the acid chloride dissolved in benzene or like solvent.

Instead of thionyl chloride mentioned above, phosphorous trichloride or phosphorous pentachloride may be used. It is important in connection with all of these chlorides that the product resulting be properly freed from hydrochloric acid or other compounds which separate.

The starting materials for these various processes are obtainable on the market. The products obtained are especially useful in connection with producing water-repellence in various materials as set forth in our copending application Serial No. 76,738, filed April 28, 1936.

While the invention has been described in detail according to the preferred manner of carrying out the process, it will be obvious to those skilled in the art after understanding the invention, that changes and modifications may be made therein without departing from the spirit or scope of the invention, and it is intended in the appended claims to cover all such changes and modifications.

What is claimed as new and desired to be secured by Letters Patent, is:

1. As a new compound an isocyanate having the general formula R.S.CH₂.N=C=O in which R is an alkyl radical having at least ten carbon atoms.

2. As a new compound an isocyanate having the general formula R.O.phenyl.N=C=O in which R is an alkyl radical having at least ten carbon atoms.

3. As a new compound, an alkyl-aromatic isocyanate, said an alkyl radical containing at least ten carbon atoms in which the isocyanate group N=C=O is joined directly to the aromatic ring and in which said alkyl radical is separated from the aromatic ring by a member selected from the group consisting of oxygen and sulfur.

4. As a new compound, hexadecyl oxyphenyl isocyanate having the formula

5. As a new compound, an isocyanate having the formula C₁₈H₃₇S.CH₂.N=C=O.

6. An isocyanate having the formula

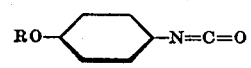

wherein R is a long chain alkyl radical.

7. A process of producing an isocyanate which comprises causing phosgene to react on a compound of the formula:

wherein R is a long chain alkyl radical.

8. A process for producing an isocyanate which comprises reacting para nitro phenolate with hexadecyl halide, reducing the nitro group to obtain hexadecoxy phenyl amine, passing hydrogen halide and then phosgene thereinto, and displacing the hydrogen halide gas to produce hexadecoxy phenyl isocyanate.

9. As a new compound, an isocyanate having the general formula R.X.Y.N=C=O, in which R is an alkyl radical of at least 10 carbon atoms, X is a radical selected from the group consisting of oxygen and sulfur, and Y is a hydrocarbon radical containing not more than six carbon atoms.

10. A process which comprises causing phosgene to react on the hydrohalide of a primary amine having the general formula R.X.Y.NH₂, in which R is an alkyl radical of at least 10 carbon atoms, X is a radical selected from the group consisting of oxygen and sulfur, and Y is a hydrocarbon radical containing not more than 6 carbon atoms, the reaction being carried out in an inert solvent to produce the corresponding isocyanate.

11. A process of producing an isocyanate which comprises, causing phosgene to react on a primary alkyl aromatic amine, said alkyl radical containing at least 10 carbon atoms, and in which said alkyl radical is separated from the aromatic ring by a member selected from the group consisting of oxygen and sulfur, to produce the corresponding isocyanate.

12. As a new compound isocyanate having the general formula $R.O.CH_2.N=C=O$, in which R is an alkyl radical having at least 10 carbon atoms.

WALTHER KAASE.
ERNST WALTMANN.

CERTIFICATE OF CORRECTION.

Patent No. 2,340,757.   February 1, 1944.

WALTHER KAASE, ET AL.

It is hereby certified that error appears in the printed specification of the above numbered patent requiring correction as follows: Page 2, second column, line 30, for "cholesteral" read --cholesterol--; line 46, for "indiacted" read --indicated--; page 3, second column, line 20, for "hydrazine" read --hydrazide--; page 4, second column, line 15, for the word "for" read --of--; line 75, for that portion of the formula reading "$CH_2.N$" read --$CH_2.CH_2.N$--; page 5, second column, line 25, claim 3, strike out "an" after "said"; page 6, second column, line 1, claim 12, before "isocyanate" insert --an--; and that the said Letters Patent should be read with this correction therein that the same may conform to the record of the case in the Patent Office.

Signed and sealed this 11th day of April, A. D. 1944.

Leslie Frazer

(Seal)   Acting Commissioner of Patents.